United States Patent [19]

Podgorny et al.

[11] 4,203,711
[45] May 20, 1980

[54] THERMAL ABSORPTION COMPRESSOR

[76] Inventors: Anatoly N. Podgorny, ulitsa Sumskaya, 118, kv. 14, Kharkov; Ilya L. Varshavsky, Leninsky prospekt, 66, kv. 141, Moscow; Viktor V. Solovei, prospekt Lenina, 41a, kv. 4; Elena V. Sinegubova, ulitsa Bljukhera, 45, kv. 183, both of Kharkov, all of U.S.S.R.

[21] Appl. No.: 898,425

[22] Filed: Apr. 19, 1978

[51] Int. Cl.² .................. F04B 37/02; F04B 37/04
[52] U.S. Cl. ................................................ 417/207
[58] Field of Search ............... 417/207; 423/644, 645; 55/388, 390, 208

[56] References Cited

U.S. PATENT DOCUMENTS

| 1,912,784 | 6/1933 | Miller et al. | 55/208 X |
| 3,176,446 | 4/1965 | Siggelin | 55/388 X |
| 4,046,525 | 9/1977 | Matsuo et al. | 55/390 X |
| 4,108,605 | 8/1978 | Billings | 423/644 X |

Primary Examiner—John J. Vrablik
Assistant Examiner—Edward Look
Attorney, Agent, or Firm—Haseltine, Lake & Waters

[57] ABSTRACT

A rotatable base plate carries generator-sorbers grouped into sections with aid of manifolds with pipes. To the opposite sides of the rotatable base plate there are provided a heat source and a source of a coolant, disposed in diameteric opposition relative to the rotatable base plate. There is provided a gas-distributing mechanism which alternatingly connect the pipes of the sections of the generator-sorbers to the delivery line and to the intake line, as they are brought by the rotation of the base plate, respectively, into the heating and cooling zones.

7 Claims, 5 Drawing Figures

THERMAL ABSORPTION COMPRESSOR

FIELD OF THE INVENTION

The invention relates to the refregerating equipment and, in particular, to the thermal absorption compressors working with solid sorbents. The term "sorbent" implies herein and hereinafter materials which under the action of either cold or heat absorb or desorb an adsorbent i.e. gas.

The invention can be used to advantage in the refrigerating apparatus in which gaseous hydrogen is utilized as the working fluid and in machines for liquefaction of hydrogen. Besides, the disclosed thermal absorption compressor can be incorporated in power installations for conversion of thermal energy into mechanical one.

BACKGROUND OF THE INVENTION

There is a growing trend nowadays to utilize hydrogen as a fuel or as a working fluid. The main process component in the production, delivery and utilization of hydrogen is a machine for compressing hydrogen. Quite promising is the type of compressors in which reversible intermetallic hydrites are used for thermochemical compression of hydrogen. This method of compression of hydrogen rids of a whole number of intermediate steps in the whole production cycle "thermal energy—compressed gaz", which improves the efficiency of the compression. Compression, according to this method is effected by means of special apparatus called thermal absorption compressors. Normally, a thermal absorption compressor (see, for instance, the SU Pat. No. 389667 comprises a generator-sorber in the form of a vessel with an extended heat exchange surface. The vessel contains a solid sorbent in the form of a fine-pulverulent material with a capacity to absorb or desorb the adsorbent, i.e. hydrogen, depending on the heat flux sense. Cooling or heating of the sorbent to cause the sorbtion or desorbtion process is done either with electric heaters or a convection heat exchanger in direct contact with the fine-grain material contained in the vessel. The feed and removal of the hydrogen is effected by means of a gas distribution mechanism of the valve type associated with the generator-sorber.

For the purpose of stabilization of the main parameters of the flow of the hydrogen being compressed (the pressure and temperature) the existing thermal absorption compressors comprise several generator-sorbers. As a rule, the maximum number of the generator-sorbers is to suffice to ensure the flow of the desorbed hydrogen at substantially constant parameters. However, the increased number of the generator-sorbers, for example, exceeding five, results in a larger size and greater weight of the compressor. In addition, this also leads to increased consumption of the sorbent which is a relatively expensive material. The other known types of the thermal absorption compressors operate in a similar manner and differ from one another solely in the arrangement of their heat exchange surfaces relative to the sorbent.

The object of this invention is to provide a compact thermal absorption compressor ensuring stabilized parameters of the hydrogen flow in the delivery pipe.

Another object of the invention is to provide a thermal absorption compressor ensuring a higher efficiency with the same quantity of the sorbent.

SUMMARY OF THE INVENTION

These and other objects are attained by that in a thermal absorption compressor comprising generator-sorbers in the form of a vessel filled with a solid sorbent and communicating, through a gas distribution mechanism, with gas suction and delivery pipes, sources of heat and coolant acting on the generator-sorbers so as to cause sorbtion and desorbtion of the gas, wherein, according to the invention, the generator-sorbers are mounted on a rotatable base plate and grouped into sections by means of manifolds provided with connection pipes; the sources of heat and coolant being disposed substantially diametrally opposingly relative to the rotatable base plate to enable the heat carrier and coolant to be fed directly onto the surface of the generator-sorbers, the gas-distributing mechanism being adapted for alternating connecting the pipes of the manifolds with the base plate being turned to the suction inlet and to the pressure outlet which enables continuous suction of the gas at a low pressure and blowing of the desorbed gas at permanent parameters. The generator-sorbers being mounted or a rotatable base plate reduces considerably the size of the thermal absorption compressor as compared to those of the prior art having practically the same quantity of the sorbent. In addition, the rotation of the base plate relative to the sources of heat and coolant enables the generator-sorbers, after their having desorbed the gas, to be successively connected to the delivery pipe, which, in turn, ensures stabilized parameters of the flow of the desorbed gas.

It is expedient to make the rotatable base plate in the form of a disk mounted on a shaft connected to a drive, which enhances compactness of the thermal absorption compressor.

The gas-distributing mechanism can include an axial tapering opening in the butt end of the shaft and a tapering plug rotatably mounted in said axial opening and having lengthwise channels communicating on one side with the suction inlet and pressure outlet pipes and on the other side with grooves provided in the conical surfaces of said tapering plug, said shaft being provided with radial openings to which the pipes of the generator-sorbers are connected, the radial openings being disposed at the same level with the grooves of the tapering plug.

It is expedient to encase the rotatable base plate in a housing provided with branch pipes connected, respectively, to the sources of heat and coolant, to bring down losses of the heat carrier.

It is further expedient that the cross sectional size of the vessels of the generator-sorbers, mounted on the rotatable base plate and grouped in sections, should be less than their length, to decrease the thickness of the sorbent layer and thus to improve the intensity of the heat exchange.

It is advisable to provide the vessels with a closure plug of porous material, to prevent the sorbent to be carried away in the flow of the desorbed gas, in cases when said sorbent is pulverulent.

To intensify the feed and evacuation of the gas from the generator-sorbers it is expedient to dispose in the vessels thereof rods made of porous material.

BRIEF DESCRIPTION OF THE DRAWINGS

The abovementioned objects and advantages of the present invention will become more apparent from the following description of an embodiment of the invention taken in conjunction with the accompaning drawings, in which corresponding parts are identified by corresponding reference characters and in which.

Figure 1:
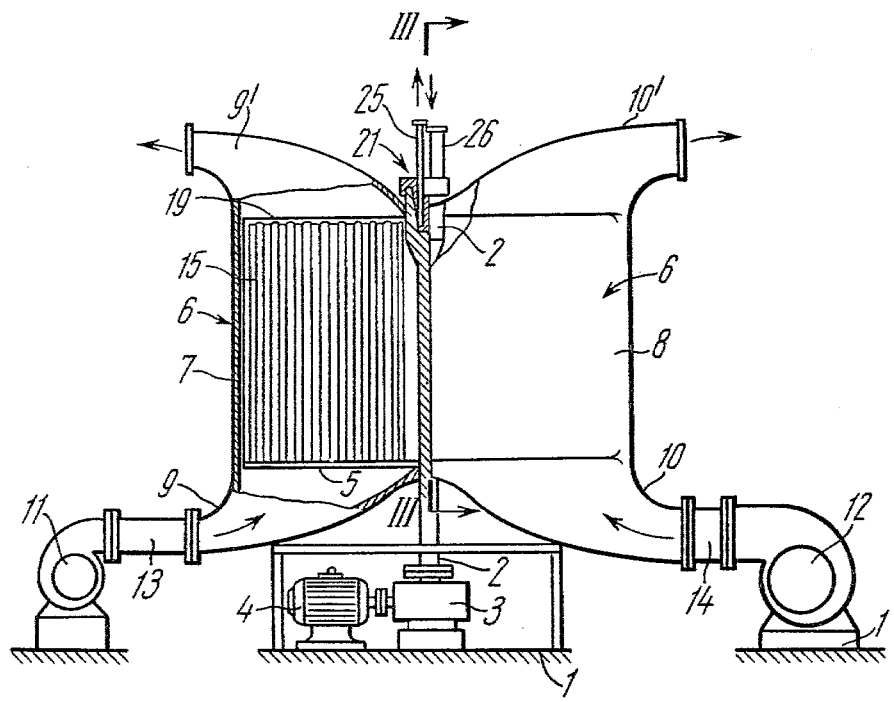
FIG. 1 is a schematic partly sectional illustration of the thermal absorption compressor, showing the housing with the rotatable base plate mounted therein.

A thermal absorption compressor comprises a bed 1 (FIG. 1) with a shaft 2 journalled therein in bearings (not shown) and connected through a reduction gear 3 with a rotation drive in the form of an electric motor 4. A rotatable base plate 5 is rigidly mounted on the shaft 2 and enclosed in a housing 6 made up of two halves 7 and 8 (FIG. 2) and X-shaped when viewed from the front. The housing 6 has pressure pipes 9 and 10 connected to compressors 11 and 12. The pressure pipes 11 and 12 contain a heat source 13 and a coolant or refrigerant source 14, respectively. For evacuation of the heat carrier end refrigerant the housing 6 is provided with pipes 9 and 10.

The rotatable base plate 5 has a shape of a disk. The generator-sorbers 15, each having a vessel 16 filled with solid sorbent 17, are mounted on the base plate 5.

If the hydrogen is used as an adsorbent, an intermetallic compound of components A-B, where A is one of the rare-earths and B is nickel or cobalt, may be used as sorbent. Mixtures $LaNi_5$; $La_{0.8}lo_{0.2}Ni_5$; $La_{0.9}Zr_0$, $Ni_5$ etc. may be used as the component A. The generator-sorbers are grouped in sections 18 by means of manifolds 19 (FIGS. 3 and 4) having connection pipes 20.

The compressor has a gas-distributing mechanism 21 (FIGS. 1, 3 and 4) with a tap valve including an axial tapering opening in the butt end of the shaft 2 and a tapering plug 22 mounted therein fixedly relative to the rotatable baseplate. In the tapering plug 22 there are provided lengthwise channels 23 and 24 communicating, respectively, on one side with a pressure outlet 25 and a suction inlet 26 of the compressor, and on the other side with grooves 27 and 28 in the conical surface of the tapering plug 22. The channels 23 and 24 are of different diameters; the larger of them, i.e. 24, communicating with the groove 28 which is larger than the groove 27. In the shaft 2 there are provided radial openings 29 to which the pipes 20 of the manifolds 19 are connected and which are disposed at the same level with the grooves 27 and 28 of the tapering plug 22. To prevent escape of the gas, the tapering opening of the shaft 2 and the tapering plug 22 are ground-in to each other. Furthermore at the side of the larger diameter of the tapering plug 22, there is provided in the shaft 2 a stepped circular groove with a sealing ring 30 therein. The tapering plug 22 and sealing ring 30 are tightened with a nut 31. To enable rotation of the shaft 2 relative to the tapering plug 22, the latter is mounted on a resilient insert 32 made of a material having a low coefficient of friction. Rotation of the tapering plug 22 by the rotating shaft 2 is prevented by the suction inlet 26 and the pressure outlet 25 secured to the user arrangement (not shown) of the desorbed gas.

Figure 2:
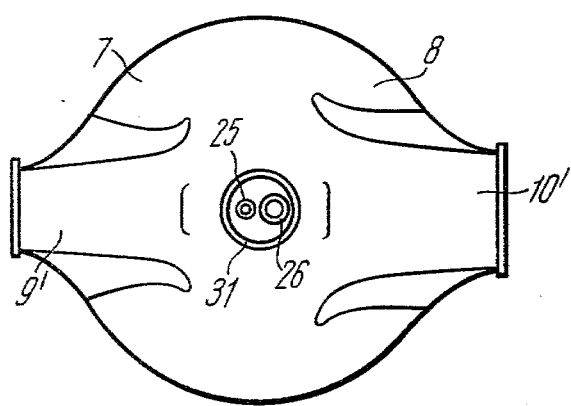
FIG. 2 is a plan view of FIG. 1, illustrating two halves of the housing.
Figure 3:
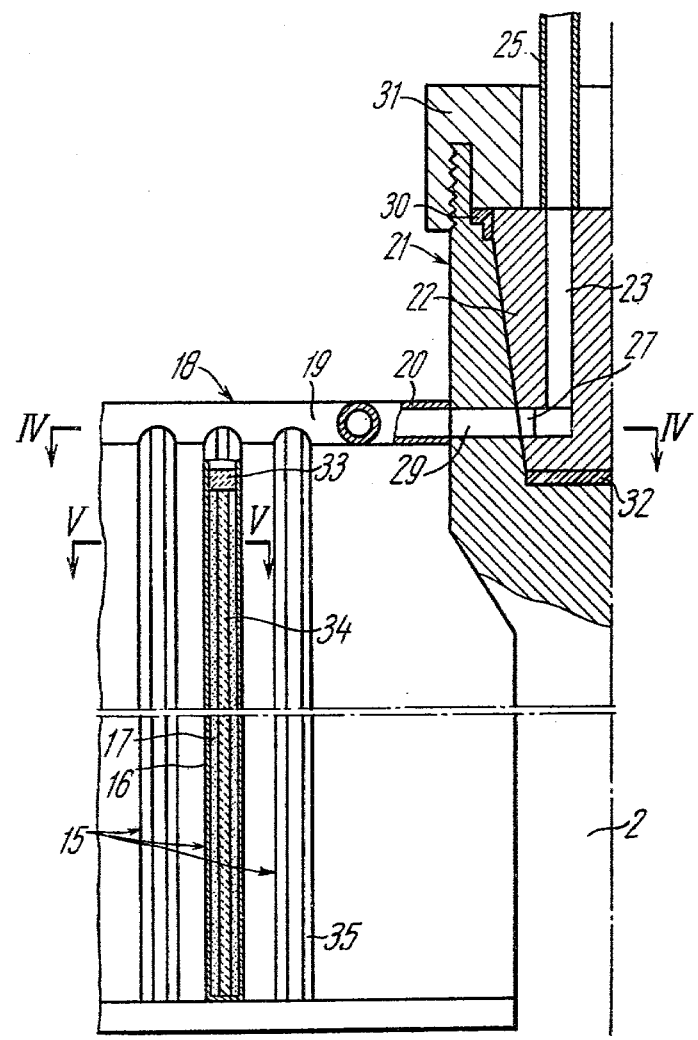
FIG. 3 is a sectional view taken on line III—III of FIG. 1, illustrating the gas-distributing mechanism communicating, through the pipes of the manifolds, with the sections of the generator-sorbers.

The vessels 16 of the generator-sorbers 15 are formed so that their cross-sectional size is for less than their length, as can be distinctly seen in FIGS. 1 and 3. In cases when a fine-pulverulent sorbent is used, the vessel is closed with a stopper 33 made of a porous material, for example, such as porous metal, ceramic or fibre glass.

In the vessels 16 there are also provided rods 34 made of porous material, for instance, fibre-glass.

Figure 5:
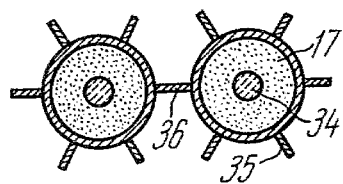
FIG. 5 is a sectional view taken on line V—V in FIG. 3, illustrating a pair of the generator-sorbers of one of the sections.

The outer surface of the vessels 16 of the generator-sorbers 15 has ribs 35 (FIG. 5). In addition, the vessels 16 mounted in radial rows on the rotatable base plate 5, are interconnected with common ribs 36 providing the rigidly of the construction and preventing the heat carrier and the refrigerant from overflowing and mixing in the space between the radial rows of the vessels 16.

As disclosed above the rotatable base plate 5 with the generator-sorbers 15 mounted thereon, is placed in the housing 6. However, under the favorable conditions the apparatus according to the invention can be operated without said housing 6, which is possible if the temperature of the ambient air is 20° C. or lower i.e. when the ambient temperature is sufficient for self-cooling of the sorbent. If that is the case the heat carrier is from supplied the source of heat directly onto the surface of the generator-sorbers 15.

Figure 4:
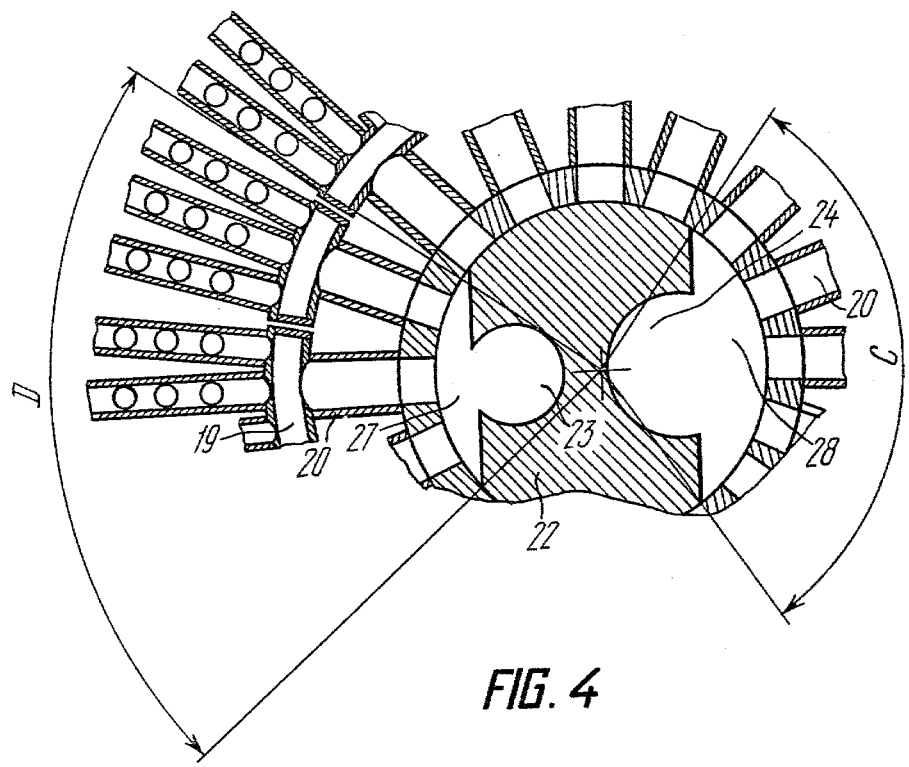
FIG. 4 is a sectional view taken on line IV—IV in FIG. 2, illustrating the gas-distributing mechanism connected through the pipes of the manifolds to the sections of the generator-sorbers in the heating zone D.

The abovedescribed thermal absorption compressor operates as follow:

From the heat source 13 and refrigerant source 14 the heat carrier and refrigerant are continuously fed by means of the compressors 12 and 13 onto the surface of the generator-sorbers 15. The sorbent 17 of the generator-sorbers 15 is being cooled, and through the suction inlet 26 absorbs the hydrogen at the low pressure from the system of its use (not shown). From the suction inlet 26 the low-pressure hydrogen being absorbed is passed into the gas-distributing mechanism 21, namely, into the lengthwise channel 24 and groove 28 of the tapering plug 22 and therefrom through the pipes 20, into the sections 18 of the generator-sorbers 15. As can be seen in FIG. 4 the process of the absorption of the low-pressure hydrogen involves the generator-sorbers 15 of which pipes 20 of the sections 18 communicate with the groove 28 of the conical plug 26 i.e. are in the cooling zone marked with a bent arrow C. While the low-pressure hydrogen is absorbed by the generator-sorbers 15 the stoppers 33 ensure its free passage into the vessels 16, while the rods 34 of porous material enable its passage over the whole length of said vessels.

Activated by the electric motor 4, the rotatable base plate 5 mounted on the shaft 2 rotates at a speed of 5 to 50 revolutions per minute, the speed of the rotation being determined by the minimum value of the coefficient of the heat exchange on the surfaces of the generator-sorbers 15.

As the shaft 2 rotates with the base plate 5, the radial openings 29 of the shaft 2 and, hence, the pipes 20 are closed off by the conical surface of the tapering plug 22 which is immovable, which means that the vessels 16 of the generator-sorbers 45 are shut off. The shut-off generator-sorbers 15 with the absorbed hydrogen are moved from the cooling zone into the heating zone marked with a bent arrow D.

As the generators-sorbers 15 enter the heating zone i.e. the space defined by the half-section 7 of the housing 6, the sorbent 17 which had absorbed the hydrogen is pre-heated. Desorption of the absorbed hydrogen does not take place because the pipes 20 of the manifolds 19 of the sections 18 of the generator-sorbers 15 are closed off by the tapering surface of the tapering plug 22. Heated up to the required temperature, the generator-sorbers 15 enter the heating zone. The hydrogen is intensively desorbed. The desorbed hydrogen flows through the porous stoppers 33, passes from the vessel 16 into the manifold 19 of each section 18. The rods 34 facilitate evacuation of the desorbed hydrogen over the whole length of the vessels 16. From the manifolds 19 the desorbed hydrogen flows through the pipes 20 of each manifold 19 of each section 18 into the groove 27 and, through the lengthwise channel 23 of the tapering plug 22, enters the pressure inlet 25 and then is forced by the compressor into the system of its use (not shown). The continuous rotation of the base plate 5 relative to the sources of the heat carrier and refrigerant 13 and 14 respectively, enables the continuity of the gas sorbtion and desorbtion process thus enabling the parameters and, in particular, the pressure of the hydrogen entering the inlet 25 to be constant.

If the intermetallic compound $LaNi_5$, is used as the sorbent, the absorption of hydrogen results in the formation of a hydrite such as $LaNi_5X_x$ where $0<x<6,7$. To provide for a process of sorption of hydrogen having a pressure of 2.5 atm. the temperature in the generator-sorber is to be about 20° and below. With lowering of the temperature the process of sorbtion intensifies. To desorb hydrogen from the hydrite, the latter is to be heated to a temperature ensuring dissociation of the hydrite. For example, to have in the pressure outlet hydrogen at a pressure of about 100 atm., it is necessary to heat up said hydrite to a temperature of about 170° C., which is to be maintained until the completion of the process of hydrogen desorbtion.

Relation between the pressure in the suction and pressure pipes of the consumption system, connected to the respective pipes of the compressor and the temperature of the sorbtion and desorbtion process, are determined by the physico-chemical properties of the sorbents and hydrites, and can be found from the related technical literature.

While the invention has been described herein in terms of the preferred embodiment, various changes in the shape and size of parts may be made without departing from the scope as defined by the claims below.

What we claim is:

1. A thermal absorption compressor comprising:
   a rotatable base plate;
   generator-sorbers, each having a vessel filled with a solid sorbent and mounted on said rotatable base plate;
   manifolds with pipes, grouping said generator-sorbers into sections;
   a heat source for delivering a heat carrier onto the surface of said generator-sorbers;
   a source of a coolant disposed substantially diametrically opposite to said heater source relative to said rotatable base plate for delivering said coolant onto the surface of the vessels of said generator-sorbers;
   a gas distributing mechanism including a tap valve having a suction inlet, and a pressure outlet, and adapted to connect alternatingly said pipes of said manifolds to the suction inlet and to the pressure outlet as a result of the rotational movement of said base plate to enable continuous suction of the gas at a low pressure and delivery of the desorbed gas with constant parameters.

2. A thermal absorption compressor according to claim 1, wherein the rotatable base plate has a shape of a disk and is mounted on a shaft connected to a drive to be rotated thereby.

3. A thermal absorption compressor according to claim 1, wherein the rotatable base plate is enclosed in a housing provided with pipes connected to the sources of heat of the coolant, respectively.

4. A thermal absorption compressor according to claim 1, wherein the vessels of the generator-sorbers have a cross-sectional size smaller than their length.

5. A thermal absorption compressors according to claim 4, wherein the vessels have stoppers made of porous material, to prevent the sorbent from being carried away by the flow of the desorbed gas.

6. A thermal absorption compressor according to claim 5, wherein the vessels have rods made of porous material, to enable evacuation of the desorbed gas and delivery of the gas being sorbed over the whole length of the vessels.

7. A thermal absorption compressor wherein: the gas distributing mechanism includes; a shaft, said shaft having an axial tapering opening in the end thereof, a tapering plug immovably mounted therein relative to a rotatable base plate, lengthwise channels respectively communicating on the one side with a suction inlet and a pressure outlet of a compressor and on the other side with grooves in conical surfaces of the plug; said shaft being further defined by radial openings communicating with pipes of the generator-sorbers and disposed at the same level with the grooves of the tapering plug.

* * * * *